US011707998B2

(12) United States Patent
Duenkel et al.

(10) Patent No.: US 11,707,998 B2
(45) Date of Patent: Jul. 25, 2023

(54) ELECTRICAL PLUG CONNECTOR AND ELECTRIC PLUG-IN CONNECTION

(71) Applicant: TE Connectivity Germany GmbH, Bensheim (DE)

(72) Inventors: Dirk Duenkel, Bensheim (DE); Gregor Panitz, Soergenloch (DE)

(73) Assignee: TE Connectivity Germany GmbH, Bensheim (DE)

( * ) Notice: Subject to any disclaimer, the term of this patent is extended or adjusted under 35 U.S.C. 154(b) by 106 days.

(21) Appl. No.: 16/868,227

(22) Filed: May 6, 2020

(65) Prior Publication Data

US 2020/0353830 A1 Nov. 12, 2020

(30) Foreign Application Priority Data

May 7, 2019 (DE) .................. 102019111749.6

(51) Int. Cl.
*B60L 53/302* (2019.01)
*B60L 53/16* (2019.01)
*H01R 13/00* (2006.01)

(52) U.S. Cl.
CPC ............. *B60L 53/302* (2019.02); *B60L 53/16* (2019.02); *H01R 13/005* (2013.01)

(58) Field of Classification Search
CPC ........................... B60L 53/302; H01R 13/005
USPC ....................................................... 320/104
See application file for complete search history.

(56) References Cited

U.S. PATENT DOCUMENTS

| 4,964,338 | A | 10/1990 | Fantoni et al. |
| 6,002,585 | A | 12/1999 | Leeb |
| 6,071,145 | A | 6/2000 | Toly |
| 6,471,530 | B1 | 10/2002 | Gimbatti et al. |
| 6,575,776 | B1 | 6/2003 | Conner et al. |
| 6,796,831 | B1 | 9/2004 | Yasufuku et al. |
| 6,840,794 | B2 | 1/2005 | Chiu |
| 7,303,427 | B2 | 12/2007 | Swain |
| 7,476,108 | B2 | 1/2009 | Swain et al. |
| 7,726,982 | B2 | 6/2010 | Ngo |
| 8,926,360 | B2 | 1/2015 | Manahan et al. |
| 9,142,922 | B2 | 9/2015 | Regnier et al. |
| 9,960,553 | B2 | 5/2018 | Regnier |
| 2008/0207029 | A1 | 8/2008 | Defibaugh et al. |
| 2016/0270257 | A1* | 9/2016 | Mark ................. H01R 9/11 |
| 2019/0322186 | A1* | 10/2019 | Arai ................. H01B 7/423 |
| 2020/0275882 | A1* | 9/2020 | Cates ................. A61B 5/721 |

(Continued)

FOREIGN PATENT DOCUMENTS

| CN | 207082656 U | 3/2018 |
| CN | 207426213 U | 5/2018 |
| JP | 2009266418 A | 11/2009 |

OTHER PUBLICATIONS

Abstract of CN207082656, dated Mar. 9, 2018, 1 page.
Abstract of CN207426213, dated May 29, 2018, 1 page.
German Search Report, dated Dec. 18, 2019, 10 pages.

*Primary Examiner* — Suchin Parihar (74) *Attorney, Agent, or Firm* — Barley Snyder (57) ABSTRACT

An electrical plug connector includes a connector housing receiving an electrical terminal. The connector housing has an outer cooling gas connection cooling an electrical plug-in connection of the plug connector with a mating plug connector. A cooling gas is brought into the plug connector by the outer cooling gas connection through a cooling gas channel of the connector housing.

19 Claims, 3 Drawing Sheets

(56) References Cited

U.S. PATENT DOCUMENTS

2020/0303093 A1* 9/2020 Cantz .................. H01R 9/11
2020/0343020 A1* 10/2020 Tsukada ................ H01B 7/00
2020/0391601 A1* 12/2020 Maeshiro ............... F16K 17/42

* cited by examiner

Fig. 3

ELECTRICAL PLUG CONNECTOR AND ELECTRIC PLUG-IN CONNECTION

CROSS-REFERENCE TO RELATED APPLICATION

This application claims the benefit of the filing date under 35 U.S.C. § 119(a)-(d) of German Patent Application No. 102019111749.6, filed on May 7, 2019.

FIELD OF THE INVENTION

The present invention relates to an electrical plug connector and, more particularly, to cooling of an electrical plug connector.

BACKGROUND

In the electrical industry (electronics, electrical engineering, electrics, electrical power engineering, etc.), a great number of electrical connector devices or connector mechanisms, socket connectors, pin connectors and/or hybrid connectors, etc.—described hereinafter as (electrical) connectors (also: mating connectors)—are known which serve to transmit electrical currents, voltages, signals and/or data at a wide range of currents, voltages, frequencies and/or data rates. In the low-voltage, medium-voltage or high-voltage range and/or the low-current, medium-current or high-current range, and in particular in the automotive industry, connectors of this type must permanently, repeatedly and/or at short notice after a comparatively long period of inactivity guarantee a transmission of electrical power, signals and/or data in mechanically loaded, warm, possibly hot, contaminated, damp and/or chemically aggressive environments. Owing to a wide range of applications, a great number of specifically configured connectors are known.

Such a connector and possibly the associated (for example in the case of a connector device or a connector mechanism) or parent (for example in the case of a connector mechanism) housing thereof can be installed on an electrical wire, a cable, a cable harness, etc.,—described hereinafter as an assembled (electrical) cable—or at/in an electrical mechanism or device, such as, for example, at/in a housing, at/on a leadframe, at/on a printed circuit board, etc., of a (power) electrical, electro-optical or electronic component or an appropriate aggregation, etc. (electrical entity).

If a connector (with/without a housing) is located on a cable, a wire or a cable harness, this is also known as a flying (plug) connector or a plug, a socket or a coupling; if it is located at/in an electrical, electro-optical or electronic component, aggregation, etc., then this is also known as a connector mechanism, such as, for example, a (built-in/built-on) connector, a (built-in/built-on) plug or a (built-in/built-on) socket. A connector at such a mechanism is further often also described as a (plug) receptacle, pin trough, pin strip or header. Within the context of electrical power engineering (producing, converting, storing, transporting and forwarding electrical high-voltage current in electrical networks, preferably with three-phase high voltage transmission), this is known as cable fittings, owing to their comparatively complex structure.

A connector of this type must guarantee a perfect transmission of electricity, wherein mutually corresponding and partially complementary connectors (connectors and mating connectors) usually have locking mechanisms and/or fastening mechanisms for locking and/or fastening the connector on/in the mating connector, or vice versa, in a permanent but normally detachable manner. Furthermore, an electrical connecting mechanism for a connector, for example having or comprising an actual contact device (terminal; usually formed materially in one piece or integrally, for example a contact element, etc.) or a contact mechanism (terminal; usually formed in multiple parts, in two parts, in one piece, materially in one piece or integrally, for example a one-part or multiple-part (crimp) contact mechanism), must be received securely therein. Such a connecting mechanism can be provided as a connector (see above), i.e. without a housing, for example flying in a (pre)assembled electrical cable.

Efforts are constantly being made to improve electrical connectors and the terminals thereof, in particular to design them more effectively and make them more cost-effective and/or produce them more cost-effectively. An increasing hybridization and electrification of a drive train of a vehicle and an increasing electrification of ancillary equipment results in, amongst other things, thermal loads which can have adverse effects if they are not countered. This relates to, amongst other things, electrical plug-in connections in a vehicle. In this case, there is an increasing need for cooling, as is known in cable fittings from the field of electrical power engineering.

U.S. Pat. No. 8,926,360 A1 discloses an electrical connection with an active cooling mechanism, wherein the electrical connection comprises at least one electrical plug-in connection made up of one female and one male terminal. Where applicable, the at least one female terminal is surrounded by heat-resistant electrical insulation and is fitted in a wall of an electrical appliance together with a comparatively good heat-conductive heat sink. The female terminal further has an opening, so that heat which is created in the female terminal can be discharged out of the female terminal. The heat which is created between the female terminal and a male terminal can be transported away from the heat sink and the opening of the female terminal by a ventilator via ambient air of the electrical connection.

SUMMARY

An electrical plug connector includes a connector housing receiving an electrical terminal. The connector housing has an outer cooling gas connection cooling an electrical plug-in connection of the plug connector with a mating plug connector. A cooling gas is brought into the plug connector by the outer cooling gas connection through a cooling gas channel of the connector housing.

BRIEF DESCRIPTION OF THE DRAWINGS

The invention will now be described by way of example with reference to the accompanying Figures, of which.

DETAILED DESCRIPTION OF THE EMBODIMENT(S)

The invention is explained in greater detail hereinafter using exemplary embodiments with reference to the attached schematic drawings, which are not true to scale. Sections, elements, structural parts, units, components and/or diagrams which possess an identical, univocal or similar form and/or function are identified by the same reference numbers. One possible alternative, a steady-state and/or kinematic reversal, a combination, etc., which is not explained and which is not illustrated in the drawings and/or is not exclusive, to the exemplary embodiments of the invention or a component, a diagram, a unit, a structural part, an element or a section thereof, can be further inferred from the description.

In the invention, a feature (section, element, structural part, unit, component, function, variable, etc.) can be configured to be positive, i.e. present, or negative, i.e. absent. In this specification, a negative feature is not explicitly explained as a feature if the fact that it is absent is not deemed to be significant according to the invention. In other words, the invention actually made, and not the one constructed by the prior art, involves omitting this feature.

A feature of this specification can be applied not only in a specified manner but can also be applied in a different manner (isolation, summary, replacement, addition, placement on its own, omission, etc.). In particular, by using a reference number and a feature attributed to this, or vice versa, in the description, the claims and/or the drawings, it is possible to replace, add or omit a feature in the claims and/or the description. Moreover, as a result, a feature can be interpreted and/or specified in greater detail in a claim.

The features of the description can also be interpreted as optional features; i.e. each feature can be understood as an optional, arbitrary or as a non-binding feature. It is thus possible to detach a feature, optionally including its periphery, from an exemplary embodiment, with this feature then being transferable to a generalized inventive concept. The lack of a feature (negative feature) in an exemplary embodiment shows that the feature is optional with regard to the invention. Furthermore, in the case of a type term for a feature, a generic term for the feature can also be read alongside this (optionally further hierarchical classification into subgenus, etc.), as a result of which it is possible to generalize the feature, for example taking into account identical effect and/or equivalence.

The invention is explained in greater detail hereinafter using four exemplary embodiments (FIGS. 1 to 4) of a variant of an electrical plug-in connection of two electrical plug connectors 2, 6 (plug connector 2/6, mating plug connector 6/2) for the automotive industry. Although the invention is described and illustrated in more detail by way of the exemplary embodiments, the invention is not limited by the disclosed exemplary embodiments, but rather is of a more fundamental nature. Other variations can be derived therefrom without departing from the scope of protection of the invention.

The invention can thus also be applied generally to an electrical component and/or outside of the automotive industry, such as to a power electronics industry, electrical engineering industry, etc., for example, and can be applied very generally to technology, in particular in the electric power industry. In other words, the invention can be applied generally to an electrical entity. In this case, one exception is ground-based electrical power engineering and its derivatives in vehicles.

The drawings only illustrate those spatial sections of a subject-matter of the invention which are necessary for understanding the invention. Descriptions such as connector and mating connector, terminal and mating terminal, etc. are to be interpreted as synonymous, i.e. in each case optionally mutually interchangeable.

Figure 1:
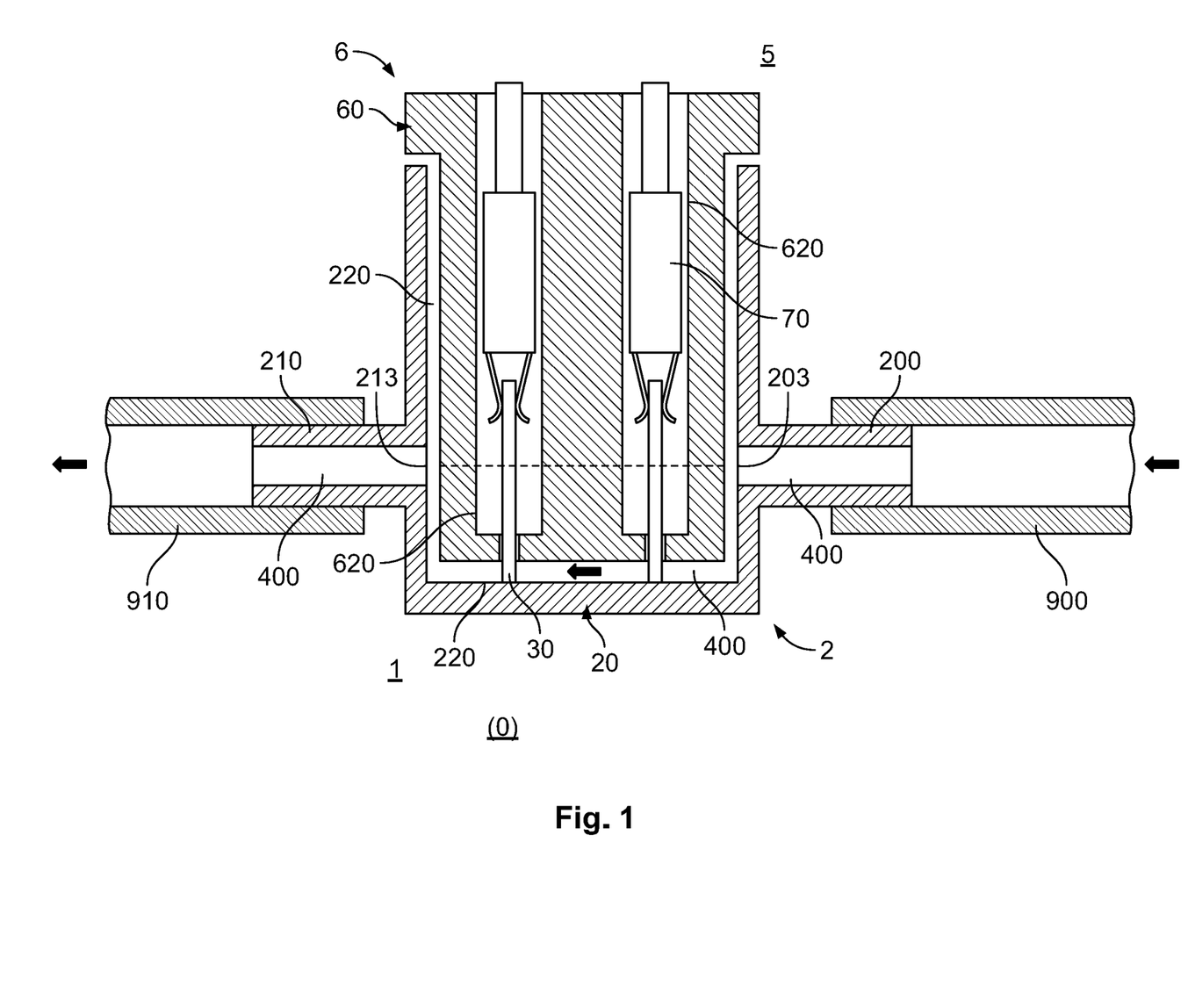
FIG. 1 is a sectional side view of an electrical plug-in connection according to an embodiment.

FIG. 1 shows a pair of electrical plug connectors 2, 6 which are plugged into one another to form a plug-in connection. A lower plug connector 2, with regard to FIG. 1, is in the present case formed as a plug receptacle 2, a pin trough 2, a pin strip 2 or a header 2 which can be formed as a built-in plug 2 or built-on plug 2 of an electrical structural component 1 of an electrical entity 0, for example.

In an embodiment, the electrical structural component 1 is a power electrical structural component and the electrical entity 0 is a power electrical entity. In an embodiment, the plug connectors 2, 6 are power plug connectors for the land vehicle industry, and the plug-in connection is a power plug-in connection for the land vehicle industry, and the electrical entity 0 is for the automotive industry. A vehicle can be understood to mean a land vehicle (road vehicle, all-terrain vehicle and/or rail vehicle), a water vehicle (torpedo and/or glider) and/or an air vehicle (propeller-driven aircraft, jet aircraft, helicopter and/or airship).

An upper plug connector 6, with regard to FIG. 1, described hereinafter as a mating plug connector 6, is formed as a flying socket connector 6 in an embodiment. In this case, the mating plug connector 6 can be part of an assembled electrical cable 5 or a different entity.

The plug connector 2, as shown in FIG. 1, has a connector housing 20 having one or one single inner receiving chamber 220 for the mating plug connector 6. In the shown embodiment, the connector housing 20 is configured to be trough-shaped. A plurality of electrical terminals 30 are fitted in the receiving chamber 220. In the shown embodiment, the terminals 30 are formed as male terminals 30, in particular pin terminals 30. Other terminals can of course be applied, as long as they are compatible with a plurality of terminals 70 of the mating plug connector 6. The terminals 30 are electromechanically connected to electrical wires of the structural component 1.

The mating plug connector 6, as shown in FIG. 1, has a connector housing 60 having at least one inner terminal chamber 620. The connector housing 60, in the shown embodiment, is block-shaped. A plurality of electrical terminals 70 are fitted in the terminal chambers 620. In the shown embodiment, the electrical terminals 70 are formed as female terminals 70, in particular socket terminals 70. Other terminals can of course be applied, as long as they are compatible with the terminals 30 of the plug connector 2. The terminals 70 are electromechanically connected to electrical wires of an assembled cable 5.

In an embodiment, the plug connector 2 is formed as a low-voltage plug connector, such as a vehicle plug connector for an electrical system of a vehicle. Electrical voltages of less than 5 kV are regarded as low voltages. Consequently, the plug connector 2 can be designed for low voltages up to voltages of 1 kV to 5 kV with currents, possibly short-term, of up to 500 A. In particular, the plug connector 2 is not suitable for voltages which are customary in electrical power engineering (medium voltage (medium-voltage networks from approximately 3-10 kV), high voltage (transmission networks from approximately 60-110 kV or transport networks above 110 kV)); the plug connector 2 thus is not formed as a cable fitting.

In other words, the plug connector 2 does not have an outer shield (electrical conductive layer, protective cover, etc.) on its connector housing 20 for transporting away surface charges, for field distribution, for electromagnetic shielding, etc. In other words, the connector housing 20 is electrically non-conductive on the outside. There is no specially fitted Faraday cage located inside the connector housing 20; aside from applications for shielded coaxial cables or twisted pair cables, which possess such a cage owing to their peculiar structure but do not comprise them specially, as is the case in cable fittings.

In particular, the plug connector 2 further comprises no field controller, no grounding mechanism, no capacitive divider, no capacitive check point, no closing plug, no protection for a subsurface site, in particular buried site, for example, no UV protection and/or no protection against erosion. Furthermore, a terminal 30 of the plug connector 2 is free from a thread. In an embodiment, the plug connector 2 is free from a seal and/or free from a sealing edge for a liquid seal of a liquid cooling of the plug-in connection of the plug connector 2 with the mating plug connector 6.

In principle, a configuration of the mutually corresponding and/or partially complementary plug connectors 2, 6 is arbitrary according to the invention. However, where possible, a design is intended to be adapted to a site, to operating conditions, etc., as long as a desired, inventive cooling—of the plug-in connection, the mating plug connector 6, the plug connector 2, relevant terminals 30, 70 which are in electromechanical contact and/or relevant electromechanical connections of terminals 30, 70 to their electrical wires—is guaranteed for the operating conditions of the plug-in connection.

This relates in particular to an effective flow cross-section (throttle point(s)), achievable flow rates at reasonable fluid pressures, and fluid temperatures which are not to be exceeded, flow resistances, an achievable cooling volume, etc. for a cooling gas (arrows) which can flow through or be pumped through the plug-in connection. In other words, all cross-sectional diameters or cross-sectional dimensions of a cooling gas channel 400 described in greater detail below are to be selected such that a cooling gas can flow through the corresponding sections of the cooling gas channel 400 (branches, throttle points, etc.) as desired.

In embodiments, a cross-section which is critical for gas flow or an effective volume in an input region may differ from that of an output region of the cooling gas channel 400. In this case, the critical cross-section or the effective volume in the input region of the cooling gas channel 400 is smaller than in a downstream, for example comparable section in the output region of the cooling gas channel 400.

A needs-based fluid flow (constant and/or varying, possibly depending on the load case of the plug-in connection) of cooling gas, which can be directed or is directed through the plug-in connection, maintains a temperature of the plug-in connection, in particular a temperature of plugged terminals, within a desired working range.

According to the invention, a coolant categorically cannot be applied, since it would result in a complex sealing concept (protection against pressure peaks in the wiring system), complex coolant connections, possibly corrosion-resistant terminals 30, 70, etc. for the plug-in connection. Furthermore, coolants in the field of electric mechanisms are always a problem, which further increases with electrical power requirements.

In other words, the invention is limited to cooling gases. In an embodiment, the cooling gas is air, however it can also be a different gas, such as a substantially inert gas with respect to the terminals 30, 70, for example, such as nitrogen, for example. In this case, the nitrogen can be separated from the ambient air on board a vehicle, for example by way of a pressure swing adsorption method (PSA: Pressure Swing Adsorption). The term gas mixture (cf. air) should of course also be subsumed under the term gas. The cooling gas can be a cooling gas which is pre-cooled by an air conditioning unit or it can also be a non-pre-cooled cooling gas which comes from a ventilator or a compressor and optionally a cooler, for example, as described in greater detail below.

The connector housing 20 of the plug connector 2 has at least or precisely one upstream cooling gas connection 200 with a section of a cooling gas channel 400 of the plug-in connection, which runs downstream inwards towards the receiving chamber 220 and opens through a channel opening 203 there. Away from this, at an opposite side, optionally vertically offset, the connector housing 20 optionally has at least or precisely one downstream cooling gas connection 210 with a section of the cooling gas channel 400 which runs upstream inwards towards the receiving chamber 220 and there opens through a channel opening 213. These sections in the connector housing 20 form the cooling gas channel 400 of the connector housing 20 or of the plug connector 2 and are in fluid communication with one another via the receiving chamber 220.

The cooling gas can be transported towards the plug-in connection by the upstream cooling gas connection 200, and a heated cooling gas heated by a heat source can be transported away from the plug-in connection by the downstream cooling gas connection 210. In the present case, a respective outer cooling gas connection 200, 210 is formed as a connecting pipe 200, 210, so that a tubular cooling gas inlet 900 and/or a tubular cooling gas discharge line 910 can be pushed or plugged onto the relevant connecting pipe 200, 210 in a simple manner and can further be fixed there where appropriate.

In embodiments, the plug connector 2 can have one single, precisely two or a plurality of cooling gas connections 200. Instead of a connecting pipe 200, 210, it is of course possible to select a different fluid connection, such as a connecting flange, a connecting socket, etc., for example. Gas seals can be applied to all embodiments.

The connector housing 20 can be formed integrally or materially in one piece with its cooling gas connection 200 or its cooling gas connections. An integral form is to be understood to mean a form of the connector housing 20 with its cooling gas connection 200 or its cooling gas connections in which there is only one single structural part which can essentially only be divided by destroying it. The structural part is manufactured from one single original piece (e.g. an unmachined part) and/or from one single initial mass (e.g. plastic melt) which, for its part, is necessarily integral. Internal cohesion takes place by means of adhesion and/or cohesion. A form which is materially (adhesively) in one piece is to be understood to mean a form of the connector housing 20 with its cooling gas connection 200 or its cooling gas connections which individual parts thereof (e.g. the actual connector housing and a cooling gas connection) are materially bonded to one another (adhesive bonding, etc.) and can be separated into its individual parts preferably not without damaging one of its individual parts. The cohesion can further be generated by a non-positive connection and/or a positive connection (not in the integral form).

As shown in FIG. 1, the corresponding and partially complementary plug connectors 2, 6 are formed such that a cooling gas channel 400, through which the cooling gas can flow, forms when the plug connector 2 is in a plugged state with the mating plug connector 6, i.e. in the plug-in connection, which cooling gas channel can be supplied with cooling gas from the upstream cooling gas connection 200 and can dispose of the heated cooling gas via the downstream cooling gas connection 210. The cooling gas channel 400 is fitted such that it runs past and/or can run through at least one heat source region at which the plug-in connection is prone to heat up during operation.

In embodiments, starting from the cooling gas connection 200, a cooling gas channel in the connector housing 20 can open internally at a chamber in the connector housing 20 through the channel opening 203, wherein the chamber, apart from the channel opening 203, is formed to be gas permeable at at least one further point. Such a gas-permeable point can be formed as an at least partially open side of the plug connector 6 (plug face) or also as an open terminal access (individual terminal and/or mating terminal). In this case, the open point can be secured against an ingress of dust and dirt by a gas-permeable layer, for example a membrane.

In the present case, as shown in the arrows in FIG. 1, the plug connectors 2, 6 are mutually formed such that the cooling gas from the upstream cooling gas connection 200 flows laterally towards the mating plug connector 6 in the plug connector 2, wherein a cooling gas flow meets an outer side of the mating plug connector 6 at an angle of approximately 90°. In chronological sequence, the cooling gas flows in the direction of a free end region (plug face) of the mating plug connector 6 and beyond it. The cooling gas then flows away in the correspondingly opposite direction to the gas flowing in.

In the shown embodiment, the plug-in connection can be mutually formed such that a transverse flow through the terminal chambers 620 of the mating plug connector 6 is possible (see the dashed line in FIG. 1). For this purpose, only the connector housing 60 must have corresponding channels to the plugged terminals 30, 70, towards and away from the plugged terminals 30, 70, for example, wherein these channels are in fluid communication with the cooling gas channel 400. These concepts can of course be alternatively or additionally applied to the mating plug connector 6.

The cooling gas channel 400, downstream of its upstream cooling gas connection 200, can initially open out into an intermediate region between the plug connector 2 and the mating plug connector 6, and this intermediate region can further extend to the downstream cooling gas connection 210 in the embodiment of FIG. 1. This makes indirect flow cooling of the electromechanical terminal connections 30, 70 possible. The cooling gas can be discharged downstream of the downstream cooling gas connection 210, away from the electrical plug-in connection, at a lower or higher point, for example. In particular, such a discharge can open out at/in a (lower) splash-proof trough.

Figure 2:
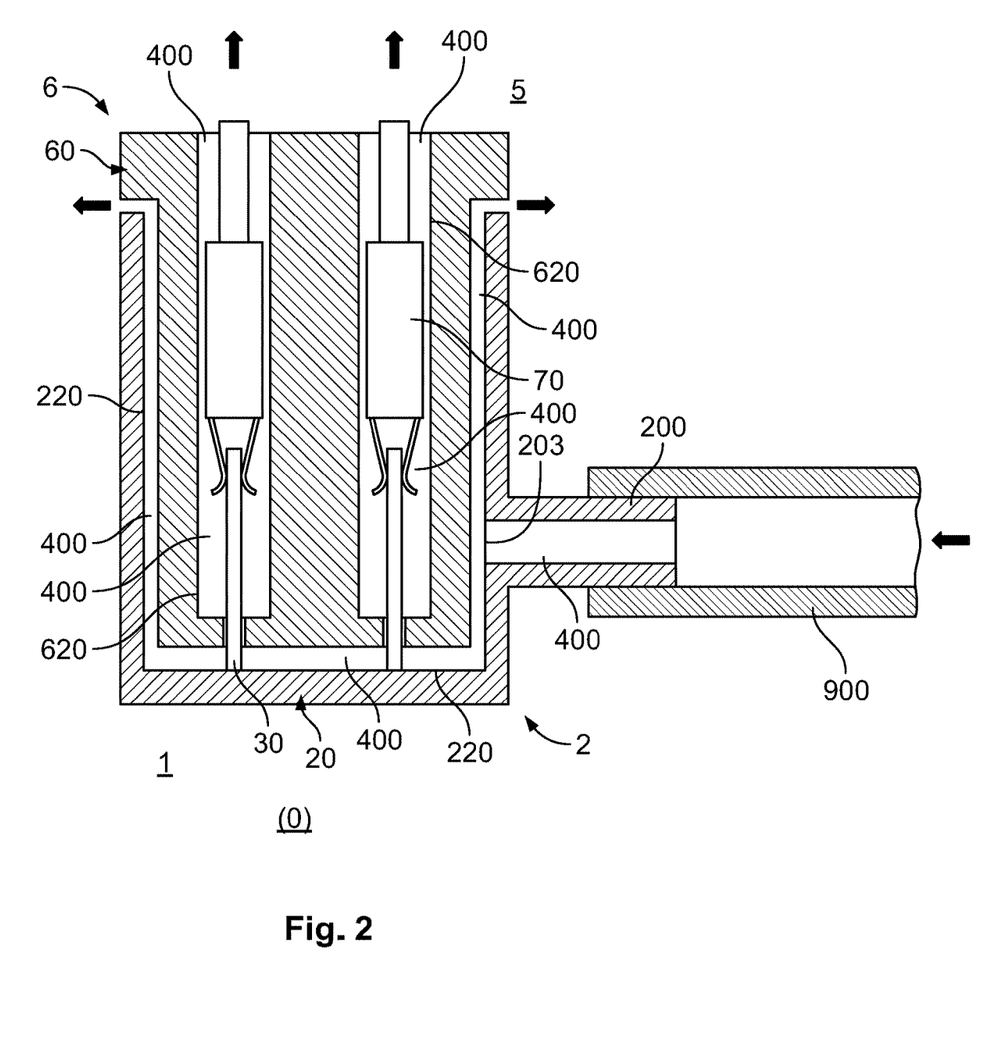
FIG. 2 is a sectional side view of an electrical plug-in connection according to another embodiment.

FIG. 2 shows another embodiment of a pair of electrical plug connectors 2, 6 which are plugged into one another to form a plug-in connection. The embodiment from FIG. 2 is different from that of FIG. 1 in that the downstream cooling gas connection 210 is absent and instead the heated cooling gas is being disposed of via open points or regions on the outside of the plug-in connection. In the embodiment of FIG. 2, these are terminal chambers 620 of the mating plug connector 6, for example, which are open on the outside away from the plug face and/or external intermediate regions between two abutting edges of the two plug connectors 2, 6. Additionally or alternatively, other channels with openings to an environment can be fitted in/at the plug connector 2, the mating plug connector 6 and/or the plug-in connection.

In the embodiment shown in FIG. 2, the plug connectors 2, 6 are mutually formed such that the cooling gas from the upstream cooling gas connection 200 in turn initially flows laterally towards the mating plug connector 6 in the plug connector 2, wherein a cooling gas flow meets an outer side of the mating plug connector 6 at an angle of approximately 90°. In chronological sequence, on the one hand, the cooling gas in turn flows in the direction of a free end region (plug face) of the mating plug connector 6 and, on the other hand, in an opposite direction between the mating plug connector 6 and the plug connector 2.

In the first case, as shown in FIG. 2, the cooling gas subsequently enters into the terminal chambers 620 of the mating plug connector 6 in the region of the plug face thereof, flows over the terminals 30, 70 plugged there and completely passes through the terminal chambers 620; the cooling gas subsequently escapes from the terminal chambers 620 of the mating plug connector 6, away from the plug face of the mating plug connector 6. In the second case, the cooling gas subsequently flows along a gap between the plug connectors 2, 6 to the outer abutting edges of the two plug connectors 2, 6; here, the cooling gas escapes to the environment of the plug-in connection 2 & 6. These concepts can of course be alternatively or additionally applied to the mating plug connector 6.

In the embodiment of FIG. 2, the cooling gas channel 400, downstream of its upstream cooling gas connection 200, can initially open out into the intermediate region between the plug connector 2 and the mating plug connector 6, and extend downstream into terminal chambers 620 of the plug-in connection and/or a further intermediate region of the plug-in connection. This makes direct and optionally additionally indirect flow cooling of the electromechanical terminal connections 30, 70 possible. In particular, a cooling gas discharge line can be dispensed with in such an embodiment; in this case, the heated cooling gas leaves the plug-in connection at openings between the plug connectors 2, 6, at insertion openings of the terminals 70 in the mating connector 6 and/or other channels which run outwards.

Furthermore, the exemplary embodiments from FIG. 1 (including the explanations of these) and from FIG. 2 (including the explanations of these) can be combined with one another. In this case, the downstream cooling gas connection 210 from FIG. 1 can be converted into a second upstream cooling gas connection 210, in addition to the upstream first cooling gas connection 200, for example. In other words, the plug-in connection can be supplied with cooling gas from two cooling gas connections 200, 210. Disposal of the cooling gas then takes place as in the exemplary embodiments from FIG. 2. As a result, the plugged terminals 30, 70 can be supplied with cooling gas 'symmetrically'.

Figure 3:
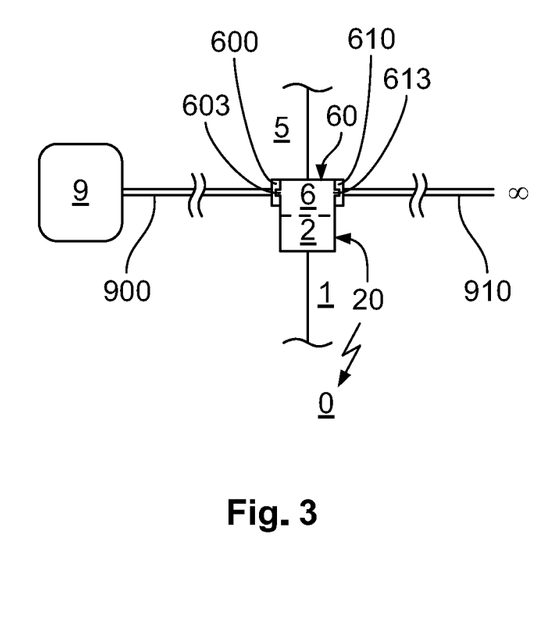
FIG. 3 is a schematic diagram of electrical plug-in connection according to another embodiment.
Figure 4:
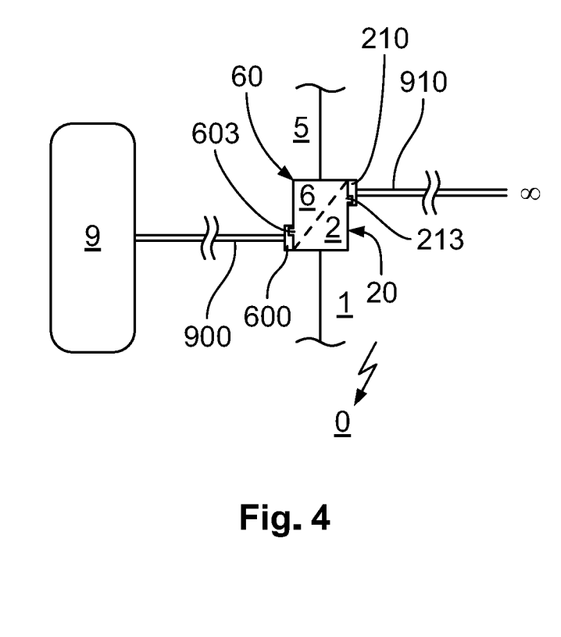
FIG. 4 is a schematic diagram of electrical plug-in connection according to another embodiment.

FIGS. 3 and 4 show further embodiments of the invention, wherein the plug-in connections, which are illustrated in a greatly simplified manner, are illustrated as interconnected in an electrically (vertically with regard to these figures) and fluidically (horizontally with regard to these figures) rudimental manner. The respective plug-in connection at 2 and 6 is supplied with cooling gas by a cooling gas inlet 900 from a ventilator 9, a compressor 9 (optionally including cooling), an air conditioning unit 9, etc. The cooling gas subsequently enters into the plug-in connection 2 & 6 and through this, and leaves the plug-in connection 2 & 6 remotely, instead of supplying with cooling gas via a cooling gas discharge line 910 (similar to FIG. 1). In this case, the cooling gas discharge line 910 is optional (similar to FIG. 2).

In the embodiment from FIG. 3, the mating plug connector 6 has both an upstream cooling gas connection 600, with its upstream channel opening 603, and a downstream cooling gas connection 610 with its downstream channel opening 613. The cooling gas can be run through the plug-in connection 2 & 6 here in a manner which is similar to FIG. 1. Additionally or alternatively, the cooling gas can be run through terminal chambers of the plug-in connection 2 & 6. Furthermore, the downstream cooling gas connection 610 can be omitted, wherein the cooling gas can then be run through the plug-in connection 2 & 6 in a manner which is similar to FIG. 2, for example. This can of course be transferred to the plug connector 2.

In the embodiment from FIG. 4, the mating plug connector 6 has the upstream cooling gas connection 600 with its upstream channel opening 603, and the plug connector 2 has the downstream cooling gas connection 210 with its downstream channel opening 213. The cooling gas can be run through the plug-in connection 2 & 6 here in a manner which is similar to FIG. 1. Additionally or alternatively, the cooling gas can be run through terminal chambers of the plug-in connection 2 & 6. Furthermore, the downstream cooling gas connection 210 can be omitted, wherein the cooling gas can then be run through the plug-in connection 2 & 6 in a manner which is similar to FIG. 2, for example. This can of course be reversed in a fluid-mechanical manner.

Furthermore, in embodiments of the invention, it is possible to realize an upstream and/or downstream cooling gas connection via at least one terminal chamber or all terminal chambers. In this case, a blind chamber can also be applied, which can be closed by a blind plug in the event that the relevant plug connector 2, 6 does not need to be cooled. It is of course possible to apply the above-explained embodiments as conventional plug connectors without a connection to a cooling gas line. Moreover, in all embodiments, a plurality of cooling gas connections 200, 210 can be provided in each case instead of one cooling gas connection 200, 210.

It is of course further possible to run the cooling gas channel 400 exclusively via the plugged terminals 30, 70. In this case, a cooling gas connection of a mating plug connector 6 or plug connector 2 can take place via at least one empty terminal chamber, for example. Opposite thereto, the cooling gas connection can take place at the receiving chamber of the plug connector 2 or mating plug connector 6, for example, for the mating plug connector 6 or plug connector 2. Such embodiments can additionally be applied to above-mentioned embodiments. A fluid flow direction is in principle irrelevant; both the plug connector 2 and the mating plug connector 6 can be located upstream or downstream. Depending on local conditions, the cooling gas can firstly flow through the plug connector 2 or the mating plug connector 6, for example.

For reasons of cleanliness or in the case of moisture problems, for example, the plug connector 2 or the plug-in connection can of course have an additional component, such as a vent, a membrane, a seal, a pressure balance, etc. Depending on the type of plug connector 2 or plug-in connection, for example whether it is sealed or not, different embodiments can be selected for each concept. In all embodiments of the invention, additional ventilation channels or ventilation openings, in particular those which run along an outer side of the plug-in connection, can be applied in/at corresponding regions of the relevant plug connector 2 or plug-in connection.

What is claimed is:

1. An electrical plug connector, comprising:
a connector housing receiving an electrical terminal, the connector housing having an outer cooling gas connection cooling an electrical plug-in connection of the plug connector with a mating plug connector, a cooling gas is brought into the plug connector by the outer cooling gas connection through a cooling gas channel of the connector housing, the cooling gas channel opens at at least one terminal chamber of the connector housing that receives the electrical terminal, the cooling gas runs through an area of the at least one terminal chamber in which the electrical terminal is mated with a mating terminal of the mating plug connector, the outer cooling gas connection and the cooling gas channel extend perpendicular to a mating direction of the electrical terminal with the mating terminal.

2. The electrical plug connector of claim 1, wherein the plug connector is a low-voltage plug connector for an electrical system of a vehicle.

3. The electrical plug connector of claim 1, wherein the plug connector is free from a seal and/or free from a sealing edge for a liquid seal of a liquid cooling of the plug-in connection.

4. The electrical plug connector of claim 1, wherein the outer cooling gas connection is a connecting pipe, a connecting flange, or a connecting socket.

5. The electrical plug connector of claim 1, wherein the cooling gas channel is fitted in the plug connector such that the cooling gas channel runs to a heat source inside the plug-in connection, and can run past the heat source and/or can run through the heat source.

6. The electrical plug connector of claim 1, wherein, starting from the outer cooling gas connection, the cooling gas channel opens internally at a chamber in the connector housing through a channel opening, the chamber, apart from the channel opening, is gas-permeable at at least one further point.

7. The electrical plug connector of claim 1, wherein the outer cooling gas connection is the only cooling gas connection of the connector housing.

8. The electrical plug connector of claim 1, wherein the outer cooling gas connection is an upstream cooling gas connection and the connector housing has a downstream cooling gas connection.

9. The electrical plug connector of claim 1, wherein the cooling gas channel inside the connector housing opens at a receiving chamber for the mating plug connector.

10. The electrical plug connector of claim 1, wherein a cross-section of an input region of the cooling gas channel differs from a cross-section of an output region of the cooling gas channel.

11. The electrical plug connector of claim 1, wherein the connector housing is formed integrally or materially in one piece with the outer cooling gas connection.

12. An electrical plug-in connection, comprising:
an electrical plug connector including a connector housing receiving an electrical terminal, the connector housing having an outer cooling gas connection cooling the electrical plug-in connection of the plug connector with a mating plug connector, a cooling gas is brought into the plug connector by the outer cooling gas connection through a cooling gas channel of the connector housing, the cooling gas channel opens at at least one terminal chamber of the connector housing that receives the electrical terminal, the cooling gas runs through an area of the at least one terminal chamber in which the electrical terminal is mated with a mating terminal of the mating plug connector, the outer cooling gas connection and the cooling gas channel extend perpendicular to a mating direction of the electrical terminal with the mating terminal.

13. The electrical plug-in connection of claim 12, wherein the plug-in connection is free from a seal and/or free from a sealing edge for a liquid seal of a liquid cooling of the plug-in connection.

14. The electrical plug-in connection of claim 12, wherein an intermediate section of the cooling gas channel is fitted between the plug connector and the mating plug connector, the intermediate section extends past a heat source inside the plug-in connection and/or runs through the heat source.

15. The electrical plug-in connection of claim 12, wherein the plug connector or the mating plug connector has an upstream cooling gas connection, and/or the plug connector or the mating plug connector has a downstream cooling gas connection.

16. The electrical plug-in connection of claim 15, wherein the gas cooling channel opens into an intermediate region between the plug connector and the mating plug connector downstream of the upstream cooling gas connection, the intermediate region extends to the downstream cooling gas connection.

17. The electrical plug-in connection of claim 15, wherein the gas cooling channel opens into an intermediate region between the plug connector and the mating plug connector downstream of the upstream cooling gas connection, the gas cooling channel extends downstream into a plurality of terminal chambers of the plug-in connection and/or a further intermediate region of the plug-in connection.

18. The electrical plug-in connection of claim 12, wherein a cross-section of an input region of the cooling gas channel differs from a cross-section of an output region of the cooling gas channel.

19. An electrical entity, comprising:
an electrical plug connector including a connector housing receiving an electrical terminal, the connector housing having an outer cooling gas connection cooling the electrical plug-in connection of the plug connector with a mating plug connector, a cooling gas is brought into the plug connector by the outer cooling gas connection through a cooling gas channel of the connector housing, the cooling gas channel opens at at least one terminal chamber of the connector housing that receives the electrical terminal, the cooling gas runs through an area of the at least one terminal chamber in which the electrical terminal is mated with a mating terminal of the mating plug connector, the outer cooling gas connection and the cooling gas channel extend perpendicular to a mating direction of the electrical terminal with the mating terminal.

* * * * *